United States Patent [19]

Fagniart et al.

[11] 4,243,448

[45] Jan. 6, 1981

[54] METHOD AND APPARATUS FOR SEALING A TUBE OF THERMOPLASTICS MATERIAL BY WELDING

[75] Inventors: Gaston Fagniart, Valenciennes; Jean-Pierre Lemaire, Maing, both of France

[73] Assignee: Societe Anonyme dite: Vacuum Capatainer International, Paris, France

[21] Appl. No.: 23,272

[22] Filed: Mar. 23, 1979

[51] Int. Cl.³ .................. B29C 27/08; B65B 51/10
[52] U.S. Cl. .................................. 156/73.5; 53/477
[58] Field of Search .......... 156/73.5; 53/477, DIG. 2; 228/110

[56] References Cited

U.S. PATENT DOCUMENTS

| | | | |
|---|---|---|---|
| 3,468,731 | 9/1969 | Obeda | 228/110 |
| 4,119,449 | 10/1978 | Gould et al. | 156/73.5 |

FOREIGN PATENT DOCUMENTS 648402  9/1962  Canada .................................. 156/73.5

Primary Examiner—John T. Goolkasian
Assistant Examiner—Louis Falasco
Attorney, Agent, or Firm—Robert E. Burns; Emmanuel J. Lobato; Bruce L. Adams

[57] ABSTRACT

A method of sealing a tube of flexible thermoplastics material by welding in which opposite sides of the tube are pressed flat between two jaws. The flattened tube thus has two opposed flat walls which have inner faces in contact, and these flat walls are connected at two opposite edges by folds caused by the flattening of the tube. The jaws are maintained a fixed distance apart, and one is rapidly reciprocated along its longitudinal direction by a vibrator, relatively to the other jaw. This causes the contacting flat walls to rub and become so heated by friction that the contacting plastics faces melt. These molten areas unite in a weld when reciprocation of the jaw is stopped and the plastics cools.

4 Claims, 3 Drawing Figures

METHOD AND APPARATUS FOR SEALING A TUBE OF THERMOPLASTICS MATERIAL BY WELDING

FIELD OF INVENTION

The present invention relates to a method and apparatus for sealing a tube of thermoplastics material by welding.

It relates in particular, but not exclusively, to the welding of a cylindrical tube which is in one piece and consists of flexible plastics material, such as for example the filling neck of a container used for the vacuum packing of large quantities of loose powdered products according to known methods.

BACKGROUND OF THE INVENTION

A neck of this type, which generally has a thickness of the order of 1 mm. and consists of a material which melts upon the application of heat such as polyethylene, is generally sealed in an air-tight manner by the action of heat, this neck being compressed in the form of two walls placed side-by-side between two solid jaws heated to an adequate temperature to ensure melting and welding of the material in the area to be sealed.

Such a method, which comprises heating the contact area of the two walls placed side-by-side, i.e. in reality the only area for which there is any purpose in causing melting, with a view to its welding, through these walls, comprises several drawbacks.

One of these drawbacks resides in the very difficult control of the flow of the molten material as the jaws penetrate the latter, a drawback which is further increased by frequent irregularities in thickness of the neck over its periphery and by the difference in thickness frequently found from one neck to another.

Moreover, it is difficult to determine an exact optimum welding time in view of these differences in thickness from one neck to another or on the periphery of the same neck.

SUMMARY OF THE INVENTION

An object of the invention is to overcome these drawbacks by providing a method and apparatus for welding by friction, which have the advantage of causing heating and melting solely of the areas of the two walls placed side-by-side which are in contact.

A method of welding by friction is already known, but the latter applies to two separate rigid parts which are retained rigidly and which, provided that a clearance exists which enables them to move one with respect to the other, whilst remaining in contact under pressure, can be welded by friction.

According to the invention there is provided a method for sealing a tube of flexible thermoplastics material by welding, comprising flattening the tube in the area to be welded, so as to give its wall the configuration of two walls placed side-by-side and connected by two flat folds arranged at right-angles to the general direction of the tube in said area, pressing the two walls one against the other under pressure in said area, imparting alternating relative movement to the two walls in said area, whilst continuing to press them together, so as to bring about friction heating of their opposed faces in said area and their localised melting, then interrupting said movement and bringing about welding of the molten areas by cooling of the latter.

This method differs from the known method for welding by friction in that the two walls to be welded are in fact different parts of one and the same tubular wall before welding. The frictional movement, leading to this welding, acting on the flexibility of this single wall in the area of the folds of the latter connecting the two basic walls defined by the flattening of the tube.

BRIEF DESCRIPTION OF DRAWING

The invention will now be further described, by way of example, with reference to the accompanying drawing in which.

DESCRIPTION OF PREFERRED EMBODIMENT

Figure 1:
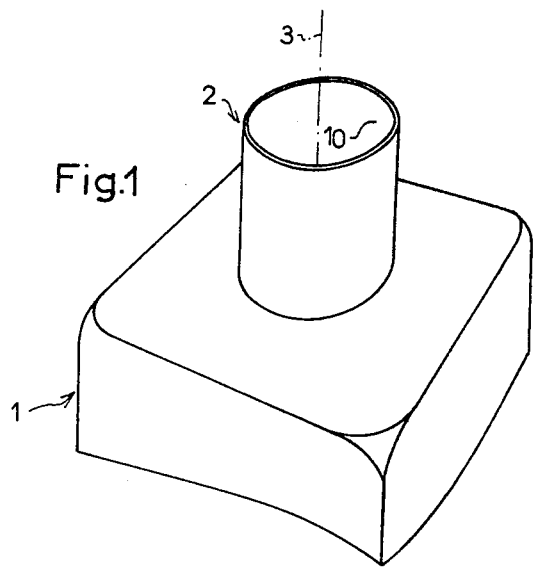
FIG. 1 is a perspective view of the upper part of a container provided for the vacuum packing of large quantities of loose powdered materials, this container comprising a neck capable of being hermetically sealed by the method according to the invention.

FIG. 1 illustrates the upper part of a container 1 made in one piece from thermoplastics material such as polyethylene for example, the wall of this container having a thickness, for example of the order of 1 mm. such that it is flexible, but nevertheless strong.

The container 1 has a general substantially parallelepipedal shape and at the centre of one of its sides comprises a filling neck 2, the shape of which is that of a cylinder of revolution about an axis 3 for example and which projects from the container. Like the remainder of the wall of the container, the wall of this neck 2 which consists of a material which melts under the application of heat and generally in one piece with a substantially identical thickness is intended to be sealed in an air-tight manner by carrying out the invention, for example in an area 4 located transversely with respect to its general direction, defined by the axis 3.

Figure 2:
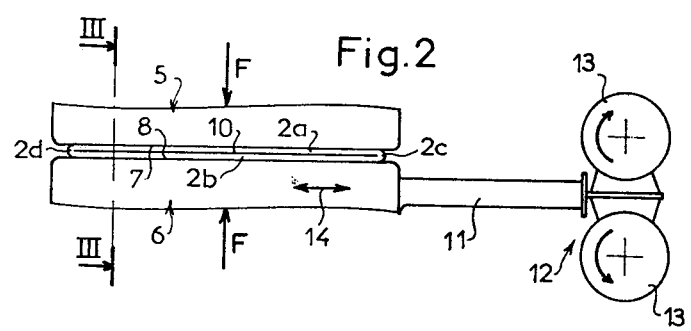
FIG. 2 shows a view of the neck, in the course of the carrying out of the sealing method according to the invention, in a direction at right-angles to the general direction of this neck.
Figure 3:
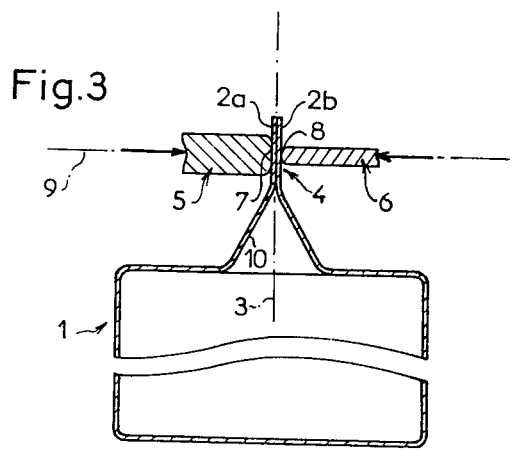
FIG. 3 is a sectional view through the plane III—III of FIG. 2.

To this end, as shown in FIGS. 2 and 3, one begins by flattening the neck 2 by means of two jaws 5 and 6 comprising opposing faces 7 and 8 respectively, located parallel to each other on either side of the neck 2 and having a dimension greater than the length of the outer semi-circumference of the neck, in a transverse direction with respect to the axis 3, the dimension of these faces parallel to the axis 3 in turn being less than this dimension. In practice, parallel to the axis 3, the jaw 6 has a dimension less than the corresponding dimension of the jaw 5, however the two jaws being located along the same mean plane 9 arranged transversely with respect to the axis 3 in the region of the area 4 to be welded.

The faces 7 and 8 may have a flat general shape as in the example illustrated, or may have complementary curved shapes, however their shape having to be suitable for allowing their movement along the plane 9, parallel to themselves, whilst preserving a constant mutual distance apart at any point.

Preferably, the faces 7 and 8 are ridged to provide better adherence to the wall of the neck 2, which they are intended to drive by friction, as will become apparent hereafter.

When the neck 2 has been flattened by the jaws 5 and 6, in the area 4, its wall has the configuration of two walls joined by a face corresponding to the inner face 10 of the neck, respectively 2a and 2b, in this case flat like the faces 7 and 8, these two walls 2a and 2b being connected by two flat folds 2c and 2d respectively, arranged parallel to the general direction 3 of the neck.

Opposing forces represented by the arrows F, directed at right-angles to the faces 7 and 8 are applied to the two jaws 5 and 6, which forces apply the basic walls 2a and 2b one against the other with a predetermined pressure.

One of the jaws, for example the jaw 5, is stationary and the other jaw, in this case the jaw 6 is retained by a resilient mounting and is integral with an arm 11 which connects it to a vibrator device 12, constituted for example by two vibrators 13 of known type which are retained by a resilient mounting and rotate in opposite directions, in order to impart to the jaw 6 an alternating movement in a direction 14 parallel to its face 8 and to the face 7 of the jaw 5, along the plane 9.

During this movement, since the forces F are maintained so that the walls 2a and 2b remain joined under pressure by the inner face 10 of the neck, an alternating relative movement in the direction of arrow 14 is imparted to these two walls 2a and 2b owing to the fact that they are connected by friction respectively to the jaw 5 and to the jaw 6, rub one against the other in the region of the face 10 and become heated. The folds 2c and 2d move on themselves alternately in one direction and the other, the areas of the wall of the neck 2 located in the immediate vicinity of these folds 2c and 2b alternately forming part of the walls 2a and 2b. This movement also results in friction of the material against itself, in the region of the face 10 of the neck, in the immediate vicinity of the folds 2c and 2d and heating of the material also occurs in this area.

If the frequency and amplitude of the relative movement of the two jaws 5 and 6 designated by the double arrow 14 and if the pressure by which the two walls 2a and 2b press against each other in the region of their face 10 under the action of the imposing forces F imparted to the jaws 5 and 6 are chosen appropriately, the heating which thus occurs over the entire face 10 in the area 4 results in localised melting of the material in this region, after a period of alternating relative movement of the two jaws which can be easily determined by a man skilled in the art. The opposing forces F accentuate the mutual frictional effect of the walls 2a and 2b in the region of the face 10, which accelerates the heating and after melting of the material causes a mixing of this material belonging initially respectively to the wall 2a and to the wall 2b.

If the relative movement of the two walls 2a and 2b is then interrupted whilst maintaining the application of the opposing forces F to the jaws 5 and 6 and if cooling of the material is then brought about or allowed, the intimately mixed material of the walls 2a and 2b solidifies and one obtains an air-tight weld of these two walls of the fold 2c to the fold 2d, i.e. air-tight transverse sealing of the neck 2 in the area 4.

It should be noted that cooling and solidification of the molten material may be consecutive with stoppage of the relative movement imparted by the jaws 5 and 6, without it being necessary to bring about cooling. In fact, the mass of molten material is very small with respect to the mass of cold solid material surrounding it, which, after stoppage of the alternating relative movement of the jaws, spontaneously causes virtually instantaneous cooling and solidification of the molten material. This provides the possibility of opening the two jaws in order to release the sealed neck immediately after the stoppage of the vibrator device 12.

Naturally, the invention may have numerous variations not diverging from its scope, in particular as regards the amplitude and frequency of the relative movement of the two jaws 5 and 6, as regards the intensity of the forces F and as regards the dimensions of the jaws 5 and 6. These values vary in particular as a function of the dimensions of the neck 2 or more generally of the tube to be sealed transversely and in particular of the thickness of the wall of this neck or this tube.

As a non-limiting example, good results have been obtained as regards welding a tube such as a neck 2 of polyethylene having a thickness of the order of 1 mm, by applying to the jaws 5 and 6, to which opposing forces of 2.8 tonnes were applied, a relative movement as designated by the arrow 14, of an amplitude of the order of 3 to 4 mm at a frequency of the order of 50 Hz.

It was thus possible to obtain a perfectly air-tight weld, making it possible to maintain the vacuum inside the container 1.

Naturally, the width of the weld obtained, i.e. its dimension on the welded wall at right-angles to the mean plane 9 of the jaws 5 and 6, depends on the dimension at right-angles to this plane 9, of the thinner jaw, i.e. of the jaw 6.

What is claimed is:

1. A method for sealing a tube of flexible thermoplastics material by welding, comprising flattening the tube in the area to be welded so as to give it the configuration of two walls placed face-to-face and connected by two flat folds extending parallel to the general direction of the tube in said area, pressing the two walls one against the other under pressure in said area, imparting alternating relative movement to the two walls in said area in a direction transverse to the general direction of the tube and parallel to the interface between said walls, whilst continuing to press them together, so as to bring about friction heating of the opposed faces of said walls in said area and their localized melting, then interrupting said movement and bringing about welding of the molten areas by cooling of the latter.

2. A method of sealing a tube of flexible thermoplastic material by welding, comprising gripping said tube in an area to be welded between two opposed jaws to give to the tube in said area the configuration of opposed walls placed face-to-face and connected by two flat folds extending parallel to the general direction of the tube, applying force to said jaws to press said opposed walls against one another while imparting alternating relative movement to said jaws in a direction transverse to the general direction of the tube and parallel to the interface between said walls to produce relative movement of said opposed walls and thereby generating friction heating and localized melting of the opposed faces of said walls, then interrupting said movement and effecting welding of said walls together by cooling.

3. A method according to claim 2, in which one of said jaws engages a lesser area of the respective wall of said tube than the other of said jaws.

4. A method according to claim 2 or 3, in which said jaws have a surface structure to grip said walls to prevent slipping of said jaws relative to said walls.

* * * * *